US009722462B2

(12) United States Patent
Satyamoorthy et al.

(10) Patent No.: US 9,722,462 B2
(45) Date of Patent: Aug. 1, 2017

(54) SYSTEM AND METHOD FOR CONTROLLING RESONANT WIRELESS POWER SOURCE

(71) Applicant: MediaTek Singapore Pte. Ltd., Singapore (SG)

(72) Inventors: Anand Satyamoorthy, Somerville, MA (US); Hasnain Akram, Woburn, MA (US); Patrick Stanley Riehl, Cambridge, MA (US)

(73) Assignee: MEDIATEK Singapore Pte. Ltd., Solaris (SG)

( * ) Notice: Subject to any disclaimer, the term of this patent is extended or adjusted under 35 U.S.C. 154(b) by 853 days.

(21) Appl. No.: 13/956,377

(22) Filed: Aug. 1, 2013

(65) Prior Publication Data

US 2014/0035384 A1 Feb. 6, 2014

Related U.S. Application Data

(60) Provisional application No. 61/679,298, filed on Aug. 3, 2012.

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 5/005* (2013.01); *H02J 17/00* (2013.01)

(58) Field of Classification Search
None
See application file for complete search history.

(56) References Cited

U.S. PATENT DOCUMENTS 9,118,203 B2 * 8/2015 Davis ...................... H02J 5/005
9,266,441 B2 * 2/2016 Abe ........................ B60L 11/123
(Continued)

FOREIGN PATENT DOCUMENTS

CN 101981780 A 2/2011
CN 102082469 A 6/2011
(Continued)

OTHER PUBLICATIONS

"International Search Report" mailed on Oct. 24, 2013 for International application No. PCT/SG2013/000330, International filing date: Aug. 5, 2013.
(Continued)

*Primary Examiner* — Rexford Barnie
*Assistant Examiner* — David Shiao
(74) *Attorney, Agent, or Firm* — Wolf, Greenfield & Sacks, P.C.

(57) ABSTRACT

A resonant wireless power system includes a source circuit having a source coil, an ac driver with a first resistance, representing the equivalent output impedance of the ac driver, and a matching network. A current probe measures the magnitude signal of the instantaneous source coil current. A voltage probe measures the instantaneous ac driver voltage. A phase detector compares the phase of the instantaneous source coil current and the instantaneous ac driver voltage, and produces a first output signal proportional to the phase difference. A first amplifier compares the magnitude signal and a target signal, and produces an error signal proportional to the difference. A first compensation filter produces the control voltage that determines the ac driver supply voltage. A second amplifier amplifies the first output signal. A second compensation filter produces the control voltage that determines the impedance of a variable element in the source circuit.

19 Claims, 8 Drawing Sheets (51) Int. Cl.
*H02J 5/00* (2016.01)
*H02J 17/00* (2006.01)

(56) References Cited

U.S. PATENT DOCUMENTS

| | | | |
|---|---|---|---|
| 2006/0192628 A1* | 8/2006 | Schulman | A61N 1/3787 333/17.1 |
| 2009/0001941 A1* | 1/2009 | Hsu | H02J 7/025 323/211 |
| 2009/0121675 A1* | 5/2009 | Ho | H02J 7/025 320/108 |
| 2010/0176659 A1 | 7/2010 | Aoyama | |
| 2010/0184371 A1 | 7/2010 | Cook | |
| 2011/0241440 A1* | 10/2011 | Sakoda | H02J 5/005 307/104 |
| 2012/0169137 A1 | 7/2012 | Lisi | |
| 2012/0242160 A1* | 9/2012 | Tseng | H04B 5/0037 307/104 |
| 2012/0256609 A1* | 10/2012 | Mei | H02M 3/156 323/282 |
| 2013/0015720 A1* | 1/2013 | Shimokawa | H02J 5/005 307/104 |

FOREIGN PATENT DOCUMENTS

| | | |
|---|---|---|
| CN | 102150340 A | 8/2011 |
| EP | 2328252 A2 | 6/2011 |
| EP | 2393181 A1 | 12/2011 |
| JP | 201260850 A | 3/2012 |
| KR | 1020120006603 A | 1/2012 |

OTHER PUBLICATIONS

Office Communication mailed Jul. 4, 2016 for Chinese Application No. 201380041252.2.
Extended European Search Report for Application No. 13825247.3 dated Jun. 24, 2016.
International Preliminary Report on Patentability for Application No. PCT/SG2013/000330 mailed Feb. 12, 2015.

* cited by examiner

SYSTEM AND METHOD FOR CONTROLLING RESONANT WIRELESS POWER SOURCE

CROSS REFERENCE TO RELATED APPLICATIONS

This application claims priority from provisional application Ser. No. 61/679,298 filed Aug. 3, 2012, which is incorporated herein by reference in its entirety.

BACKGROUND

The invention is related to the field of wireless systems, and in particular to a resonant wireless power system that allows power to be transferred throughout with variations in matching networks efficiently.

In a wireless power system, inductive coils forming a loosely-coupled transformer are used to transfer power in a non-contact fashion. In a resonant wireless power (RWP) system, impedance-matching networks are used to cancel the reactive impedance of those inductive coils, allowing power to be transferred through the system more effectively. In an idealized RWP system with a resistive load, the matching networks can be tuned perfectly to null out all reactive impedance, creating a perfectly matched circuit. In practical RWP systems, however, this idealized model does not hold. Load power varies according to the demands of the device being serviced, resulting in a varying load impedance. The coupling factor between the source and load coils changes with the relative position of the charger and charging device. And, in mass-produced devices, the matching networks suffer from manufacturing variations, so they are never perfectly in tune.

There are two complex impedances that can be used to describe most of the important aspects of a RWP system: the open-circuit impedance Zoc and the reflected impedance Zref. Mutual inductance, or coupling, between the source coil and receiver coil can be modeled in a number of different ways. In our preferred method, the coupling is modeled as a current-controlled voltage source in series with the receiver (secondary) coil. The impedance seen by this voltage source, which includes the coil, matching network and load (rectifier, dc/dc, load current), is Zoc. On the source (primary) side, when coupling is present, one can model the effect of the coupling as an impedance in series with the source coil called Zref, the reflected impedance. Both the open-circuit impedance and the reflected impedance are complex quantities—they have real (resistive) and imaginary (reactive) components. For a 1:1 RWP system, the reflected impedance is related to the open-circuit impedance by this formula:

$$Z_{ref} = \frac{(\omega M)^2}{Z_{oc}}$$

SUMMARY

According to one aspect of the invention, there is provided a current-mode resonant power source. The current-mode resonant power source includes a source circuit that includes a source coil, an ac driver with a first resistance, representing the equivalent output impedance of the ac driver, and a matching network. A current probe measures the magnitude signal of the instantaneous source coil current. An amplifier receives and compares the magnitude signal and a target signal, and produces an error signal proportional to the difference. A compensation filter receives the error signal and produces the control voltage that determines the ac driver supply voltage.

According to another aspect of the invention, there is provided a resonant power source with power-factor correction. The resonant power source includes a source circuit that includes a source coil, an ac driver with a first resistance, representing the equivalent output impedance of the ac driver, and a matching network. A current probe measures the magnitude signal of the instantaneous source coil current. A voltage probe measures the instantaneous ac driver voltage. A phase detector receives and compares the phase of the instantaneous source coil current and the instantaneous ac driver voltage, and produces a first output signal proportional to the phase difference. An amplifier receives and amplifies the first output signal, and produces an amplified signal. A compensation filter receives the amplified signal and produces the control voltage that determines the impedance of a variable element in the source circuit.

According to another aspect of the invention, there is provided a resonant wireless power system. The resonant wireless system includes a source circuit that includes a source coil, an ac driver with a first resistance, representing the equivalent output impedance of the ac driver, and a matching network. A current probe measures the magnitude signal of the instantaneous source coil current. A voltage probe measures the instantaneous ac driver voltage. A phase detector receives and compares the phase of the instantaneous source coil current and the instantaneous ac driver voltage, and produces a first output signal proportional to the phase difference. An first amplifier receives and compares the magnitude signal and a target signal, and produces an error signal proportional to the difference. A first compensation filter receives the error signal and produces the control voltage that determines the ac driver supply voltage. A second amplifier receives and amplifies the first output signal, and produces an amplified signal. A second compensation filter receives the amplified signal and produces the control voltage that determines the impedance of a variable element in the source circuit.

DETAILED DESCRIPTION

The invention involves a current-mode resonant wireless power (RWP) source and power-factor correction used by a RWP source for managing variations in operating conditions in a source device.

Figure 1:
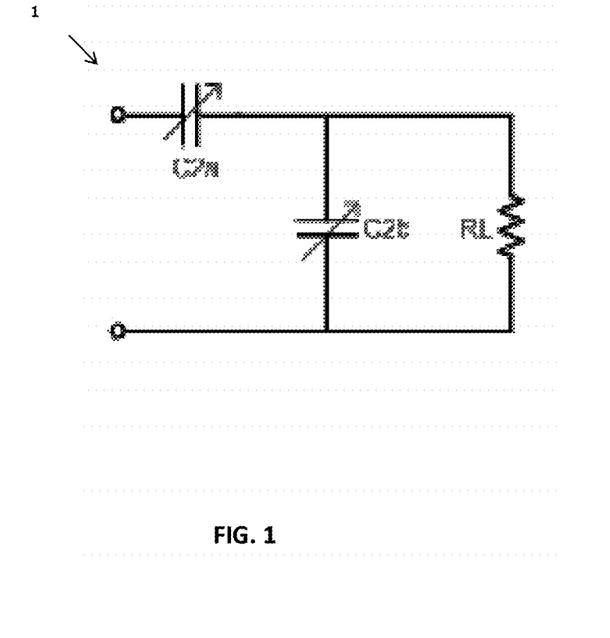
FIG. 1 is a schematic diagram illustrating a series-parallel matching network used in accordance with the invention.

In practical RWP systems, load resistance is constantly changing based on the instantaneous demands of the load circuit, e.g. battery charger. In the most general case one must consider that load resistance can vary from infinite (no load) to some small value (maximum load). Consider the example of the series-parallel tuning network 1 in FIG. 1. When the load resistance is infinite, the open circuit impedance is simply the series combination of L2, C2a and C2b, which is purely reactive, where L2 represents the receiver coil coupled to the tuning network 1. When the load resistance approaches zero, C2b is shorted out and the open-circuit impedance is just the series combination of L2 and C2a, also purely reactive. For finite resistances, the open-circuit impedance has a positive real part and an imaginary part somewhere between the two extremes.

Figure 2:
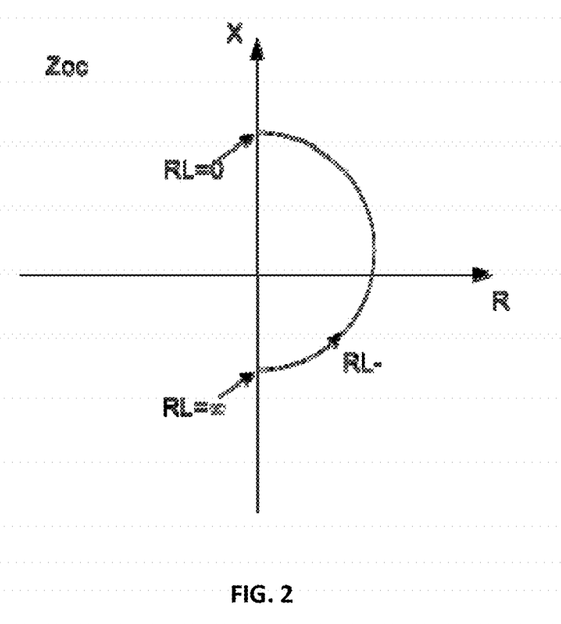
FIG. 2 is an open-circuit impedance plot of the series-parallel matching network.

It can be shown that, as load resistance decreases from infinity to zero, the open-circuit impedance traces out a counter-clockwise half-circle in the complex impedance plane, as shown in FIG. 2. Generally, only use a portion of this half-circle less than one quadrant. The lower-right quadrant represents high-Q operating points, while the upper-right quadrant represents low-Q operating points. One typically tunes to use high-Q operating points. The location of the center of the half-circle depends on the impedances in the tuning network; one can choose to position it at the origin, or above or below it on the complex axis.

The nature of a multiple-receiver RWP system is such that reflected impedances always appear in series with the source coil and with each other. Assuming that the multiple receivers do not directly affect each other's coupling (a reasonable assumption in a typical RWP system), the main mechanism by which they can affect each other is by changing the source coil current. If the source coil were driven by a current source rather than a voltage source, this interaction would be eliminated. Unfortunately, the ac power drivers that are commonly known (e.g. Class-D, Class-E) resemble voltage sources rather than current sources. Furthermore, if there are parallel elements in the tuning network, as there typically are, the ac current in the amplifier will not match the coil current, and the interaction through reflected impedance can still occur.

Figure 3:
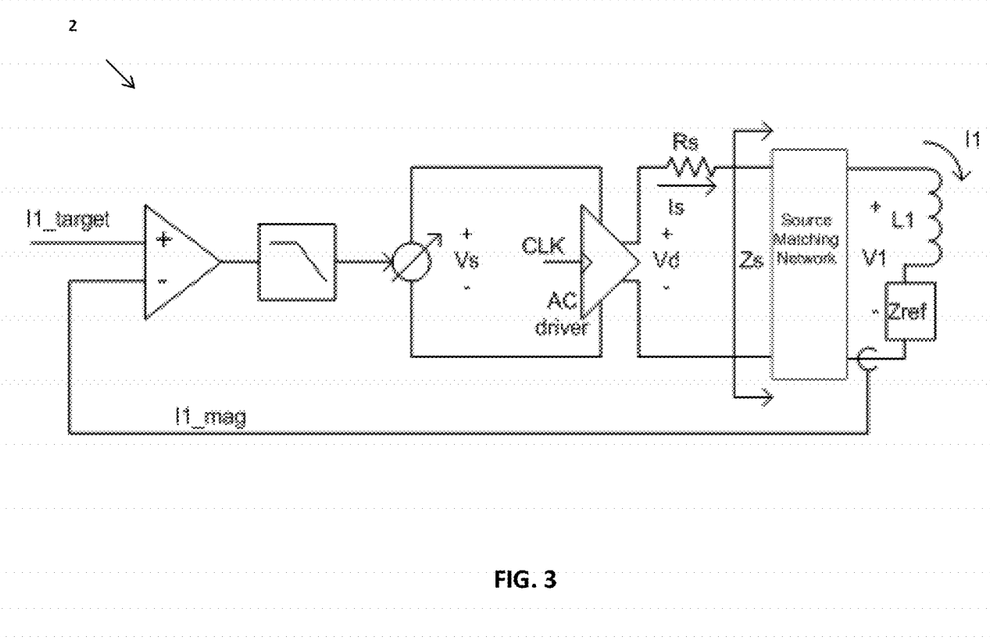
FIG. 3 is a schematic diagram illustrating a current-mode resonant wireless power (RWP) source used in accordance with the invention.

However, if one creates a feedback loop to hold the ac coil current magnitude constant, the RWP driver will behave like a current-source driver and share its advantageous properties. A conceptual block diagram 2 of such a current-mode RWP source is shown in FIG. 3. A current probe in series with the source coil detects the magnitude of the coil current I1 to generate a signal $I1_{13}$ mag. It is not important whether RMS or peak current is used for the control loop—all give the same system behavior. An amplifier is used to compare I1_mag to some target value, I1_target and produce an error signal proportional to the difference. The error signal is passed through a filter for loop compensation to produce the control voltage that determines the ac driver supply voltage Vs. The ac driver modulates the driver supply voltage Vs at a frequency determined by the clock signal CLK to drive ac power into the matching network. The resistor Rs represents the equivalent output resistance of the ac driver. The compensation filter may also provide range limiting and/or slew-rate limiting to control the behavior of the source during transients.

Figure 4:
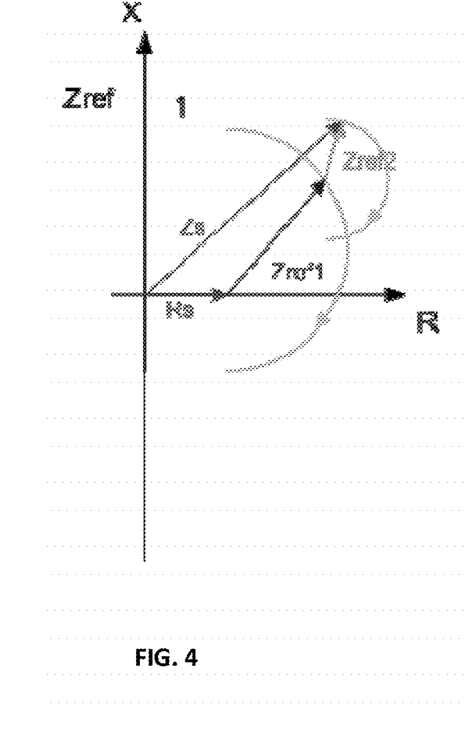
FIG. 4 is a plot illustrating a source impedance locus, two-receiver case used in accordance with the invention.

The magnitude of I1_mag is linearly proportional to the drive voltage Vs because of the linear nature of the matching network. As a result, a feedback loop is formed that forces I1_mag to be equal to I1_target in steady-state. This gives the RWP source the properties of a current-driven circuit. Referring to FIG. 4, the source current I1 will be independent of the magnitude of source impedance Zs. In order to maintain the desired I1, the source will increase the drive voltage Vs when Zs increases. If new receivers enter the charging field, for example, they will cause an increase in Zs (for example, a reflected impedance Zref2 is introduced due to the mutual inductance between the source coil and a new receiver). This will be compensated by the current-mode loop, resulting in an increase in Vs. Aside from possible transient effects due to finite control loop bandwidth, the other receivers will not be disturbed by the entrance of the new receiver.

In a voltage-driven RWP system, the source current Is can be measured to estimate the power driven into the source coil, since the voltage Vs is known. In a current-mode system, the situation is reversed. The current Is is a known value set by the control circuits. The drive voltage Vs can be used to give an indication of the power delivered into the source coil.

In a fixed-tuned RWP system, there is generally a nonzero phase angle between the drive voltage Vd and the drive current Is (refer to the phase angel of the impedance vector Zs in FIG. 4, for example). Equivalently one could state that the power factor is generally less than 1. This results in a lack of available power and a loss of efficiency relative to the ideal case in which the source impedance is tuned to be purely real. Power-factor correction (PFC) is a technique used in ac power transmission systems to adaptively correct for such unwanted reactive impedances. One can apply this technique to an RWP system to null out the reactive impedance, thus obtaining the optimal power transfer characteristic.

Figure 5:
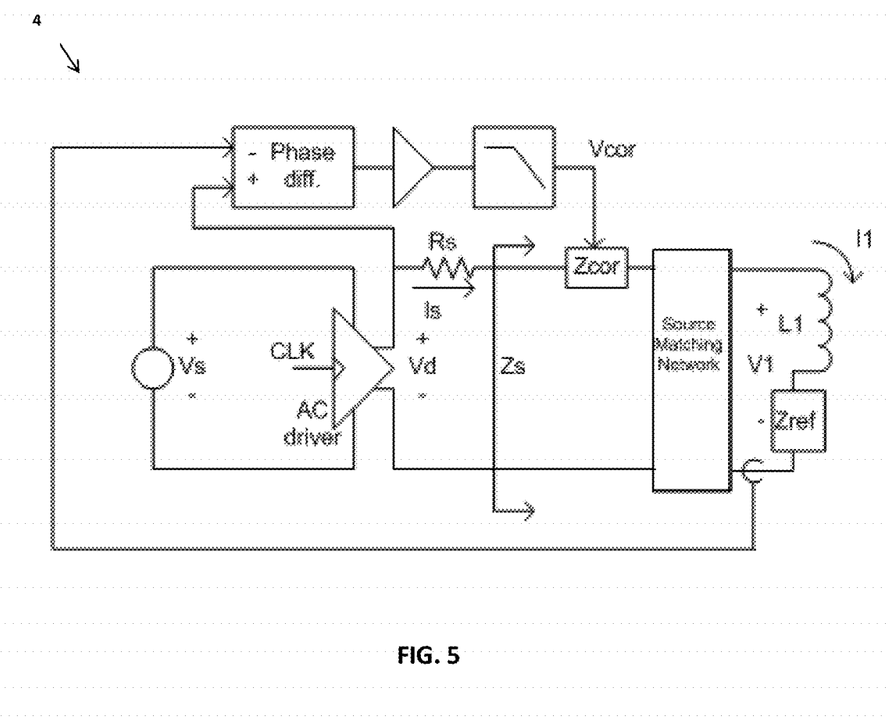
FIG. 5 is schematic diagram illustrating a RWP source with power-factor correction used in accordance with the invention.

FIG. 5 shows a block diagram 4 of a RWP source with power factor correction. A current sensor measures the instantaneous current I1, while a voltage probe measures the ac drive voltage Vd. The phases of I1 and Vd are compared by a phase detector (labeled as "Phase diff." in FIG. 5). The output signal indicating a phase difference is amplified and then filtered for loop compensation. The resulting control voltage Vcor is used to control the impedance of a variable impedance element Zcor. Zcor can be implemented by either a variable capacitance or by a variable inductance. The control loop is configured in such a way that Zcor becomes more capacitive when the phase difference is positive. The PFC control loop thus forces the phase difference between Vd and I1 to zero. This is equivalent to saying that it forces the impedance Zs to be purely real.

Figure 6:
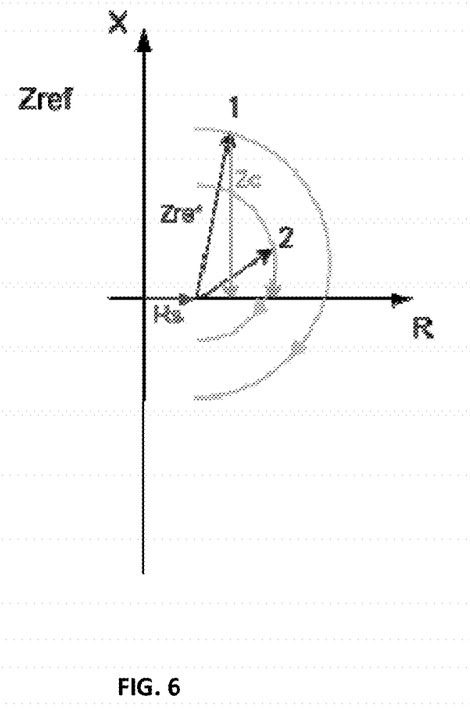
FIG. 6 is a graph illustrating complex-impedance plots for a RWP source with power factor correction.

An illustration of how PFC works using complex-impedance plots is shown in FIG. 6. This graph depicts a single-receiver scenario. Between conditions 1 and 2, both the coupling factor and the load resistance of the receiver are different. The PFC control loop is able to correct for these differences by adding a negative reactance that just cancels the positive reactance in each case. The resulting source impedance (not shown) is purely resistive. If multiple loads are present, the PFC control loop works exactly the same way. It forces the resultant vector of the reflected impedance plus the correcting impedance Zcor to be purely real. If the source tuning network is more complicated than a pure series network, the PFC loop still works the same way. It may be advantageous to tune the fixed matching network to always provide an inductive impedance, so that Zcor can be a variable capacitor, or vice versa.

The voltage Vs is fixed in a PFC source, so measuring the current I1 can be used to estimate power driven into the source coil.

Figure 7:
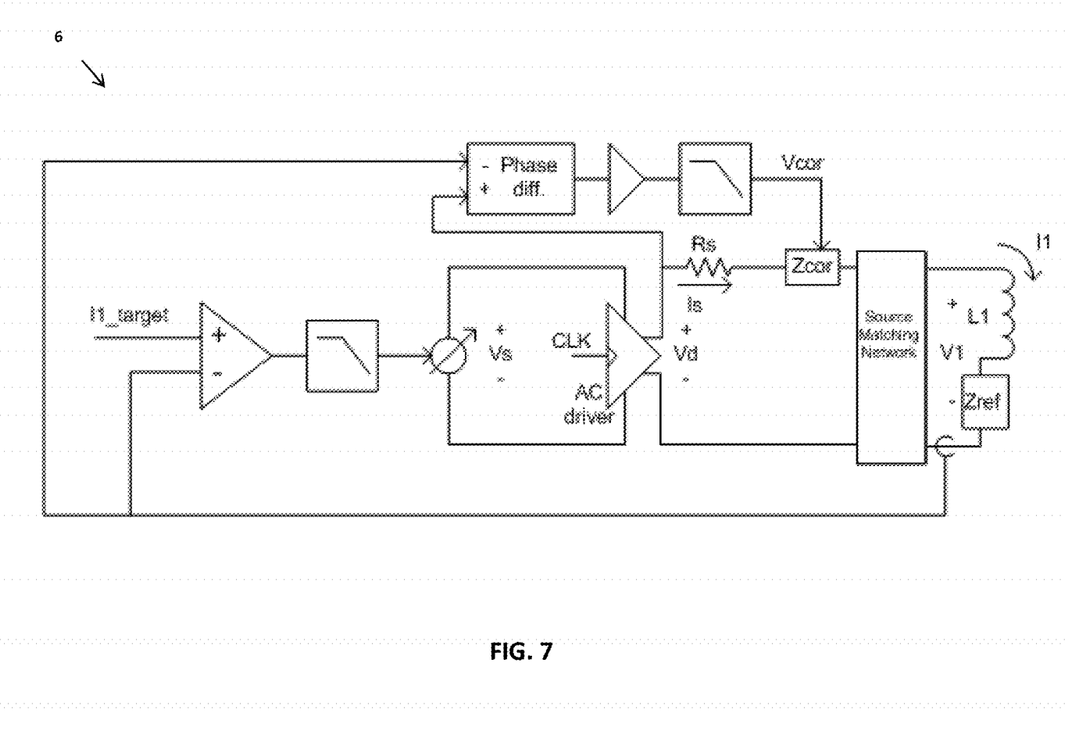
FIG. 7 is a schematic diagram illustrating a current-mode RWP source with power-factor correction used in accordance with the invention.

The two techniques shown so far can correct the magnitude and phase variations that occur when reflected impedance changes. Combining the two techniques yields a source design that suffers from none of the drawbacks previously highlighted for voltage-driven, fixed-tuned sources. A block diagram 6 of such a source is shown in FIG. 7. The magnitude and phase of I1 are both fed back to separate control loops. The magnitude is used for the current-mode loop and the phase is used in the power-factor correction loop.

In the current-mode source with power-factor correction, the magnitude of the source current Is is controlled by the current-mode loop, so the voltage Vs can be monitored to indicate the source power.

In the previous examples, the method for adjusting the magnitude of the coil current I1 was to adjust the voltage Vs. This typically requires a variable-output-voltage regulator to supply Vs to the power amplifier. Here an alternative technique is proposed for adjusting the magnitude of the coil current I1 that eliminates the need for this variable-output-voltage regulator. Since this regulator contributes an efficiency loss to the system, this alternative scheme can potentially improve the overall efficiency of the RWP system.

Figure 8:
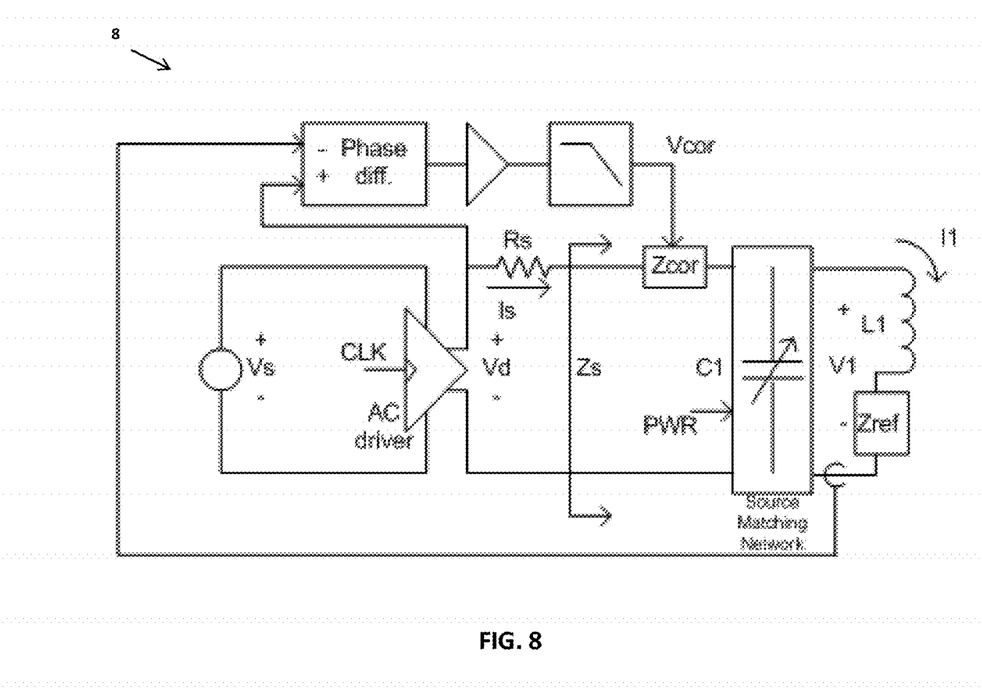
FIG. 8 is a schematic diagram illustrating an adjustable matching network for coil-current control used in accordance with the invention.

The general approach is to adjust the source matching network to change the transformation from I1 to Is, thus changing the transformation of Zref to Zs. By varying Zs, the magnitude of the I1 current can be adjusted while Vs remains fixed. Although many different matching circuits can be used, one can illustrate the principle using the simple parallel matching circuit 8 shown in FIG. 8. The parallel capacitor C1 can be adjusted by the power controller. The variable capacitor C1 can be implemented using a varactor, a capacitor bank with switches, or any alternate technique. Increasing the impedance of C1 to approach the impedance of L1+Zref causes the parallel combination to become more resonant, which causes I1 to increase relative to Is. Thus power delivered to the coil can be controlled without adjusting V1. Changing C1 also changes the imaginary component of Zs, which is undesirable for reasons previously stated. One can correct for that by including a power-factor correction loop, as shown in FIG. 8. The PFC loop corrects for the imaginary impedance variations as C1 is changed, as well as correcting for the imaginary component of Zref.

Although the present invention has been shown and described with respect to several preferred embodiments thereof, various changes, omissions and additions to the form and detail thereof, may be made therein, without departing from the spirit and scope of the invention.

What is claimed is:

1. A resonant power source comprising:
   a source circuit that includes a source coil, an ac driver with a first resistance, representing an equivalent output impedance of the ac driver, and a matching network;
   a current probe that measures a magnitude signal of an instantaneous source coil current;
   an amplifier that receives and compares the magnitude signal and a target signal, and produces an error signal proportional to the difference; and
   a compensation filter that receives the error signal and produces a control voltage that determines an ac driver voltage of the ac driver,
   wherein the current probe further measures a phase of the instantaneous source coil current, and the resonant power source further comprises:
   a voltage probe that measures a phase of the ac driver voltage; and
   a phase detector that receives and compares the phase of the instantaneous source coil current and the phase of the ac driver voltage, and produces an output signal proportional to a phase difference between the phase of the instantaneous source coil current and the phase of the ac driver voltage,
   wherein an impedance of a variable element in the source circuit is determined according to the output signal.

2. The resonant power source of claim 1, wherein the ac driver voltage is linearly proportional to the magnitude signal.

3. The resonant power source of claim 1, wherein the current probe, the amplifier, the compensation filter and the source circuit form a feedback loop that forces the magnitude signal to be substantially equal to the target signal in steady-state.

4. The resonant power source of claim 1, wherein the source circuit increases the ac driver voltage when an impedance seen by the ac driver increases.

5. The resonant power source of claim 1, wherein the compensation filter provides range limiting or slew-rate limiting properties to control the behavior of the source circuit during transients.

6. The resonant power source of claim 1, wherein the variable element is selected from the group consisting of a variable capacitance and a variable inductance.

7. The resonant wireless power system of claim 1, wherein the variable element has a variable capacitance that becomes more capacitive when the phase difference is positive.

8. The resonant wireless power system of claim 1, wherein the phase difference is forced to zero.

9. The resonant wireless power system of claim 1, wherein the impedance seen by the ac driver is real.

10. The resonant power source of claim 1, wherein a variable component in the matching network is used to control the power delivered to the source coil.

11. A resonant power source comprising:
    a source circuit that includes a source coil, an ac driver with a first resistance, representing an equivalent output impedance of the ac driver, and a matching network, wherein the ac driver is a class-D amplifier or a class-E amplifier and wherein the source circuit increases an ac driver voltage when an impedance seen by the ac driver increases;
    a current probe that measures a phase of an instantaneous source coil current;
    a voltage probe that measures a phase of an ac driver voltage of the ac driver;
    a phase detector that receives and compares the phase of the instantaneous source coil current and the instantaneous ac driver voltage, and produces a first output signal proportional to the phase difference;
    an amplifier that receives and amplifies the first output signal, and produces an amplified signal; and
    a compensation filter that receives the amplified signal and produces a control voltage that determines an impedance of a variable element in the source circuit.

12. The resonant power source of claim 11, wherein the variable element comprises either a variable capacitance or a variable inductance.

13. The resonant power source of claim 11, wherein the phase detector, amplifier, and compensation filter form a control loop configured so that the variable element becomes more capacitive when the phase difference is positive.

14. The resonant power source of claim 13, wherein the control loop thus forces the phase difference between the ac driver voltage and instantaneous coil current to zero.

15. The resonant power source of claim 11, wherein an impedance seen by the ac driver is real.

16. The resonant power source of claim 11, wherein a magnitude of the ac driver voltage is fixed.

17. The resonant power source of claim 11, wherein a variable component in the matching network is used to control the power delivered to the source coil.

18. A resonant power source comprising:
   a source circuit that comprises a source coil, an ac driver with an output current and an output voltage of constant magnitude, and a matching network coupled to the ac driver and the source coil;
   a current probe that measures a magnitude of a source coil current and measures a phase of the source coil current;
   a controller configured to adjust an impedance of the matching network such that the magnitude of the source coil current approaches a target value,
   a voltage probe that measures a phase of the output voltage of the AC driver; and
   a phase detector that receives and compares the phase of the source coil current and the phase of the output voltage of the AC driver, and produces an output signal proportional to a difference between the phase of the source coil current and the phase of the output voltage of the AC driver,
   wherein an impedance of a variable element in the source circuit is adjusted according to the output signal to reduce a difference between the phase of the source coil current and the phase of the output voltage of the AC driver.

19. The resonant power source of claim 18, wherein the matching network comprises a variable capacitance in parallel with the source coil and wherein the controller is configured to adjust a capacitance value of the variable capacitance.

* * * * *